United States Patent [19]

Assmus et al.

[11] 3,889,235

[45] June 10, 1975

[54] METHOD OF SAFEGUARDING THE TRANSMISSION OF THE CONTINUOUS POLARITY IN DATA TRANSMISSION SYSTEMS TRANSFERRING A POLARITY REVERSAL IN CODED FORM

[75] Inventors: Ulf E. Assmus; Willy Bartel; Horst Hessenmüller, all of Darmstadt, Germany

[73] Assignee: Siemens Aktiengesellschaft, Munich, Germany

[22] Filed: Oct. 11, 1973

[21] Appl. No.: 404,628

[30] Foreign Application Priority Data

Oct. 11, 1972 Germany............................ 2249637

[52] U.S. Cl...... 340/146.1 R; 340/146.1 AJ; 360/53

[51] Int. Cl.......................... H03k 13/34; H04b 3/46

[58] Field of Search............ 340/146.1 AJ, 146.1 R, 340/146.1 BA, 146.1 AG, 174.1 B; 360/53

[56] References Cited

UNITED STATES PATENTS

| | | | |
|---|---|---|---|
| 2,951,229 | 8/1960 | Goldstein | 340/146.1 AG |
| 3,250,900 | 5/1966 | Diamant | 340/146.1 AG |
| 3,252,139 | 5/1966 | Moore | 340/146.1 BA |
| 3,685,015 | 8/1972 | Bocek | 340/146.1 AG |
| 3,731,293 | 5/1973 | McFiggans | 340/174.1 B |
| 3,760,371 | 9/1973 | Pitroda et al. | 340/146.1 BA |

*Primary Examiner*—Malcolm A. Morrison
*Assistant Examiner*—R. Stephen Dildine, Jr.
*Attorney, Agent, or Firm*—Schuyler, Birch, Swindler, McKie & Beckett

[57] ABSTRACT

A method is disclosed for checking and, if necessary, correcting the polarity reversal transmission signals in a PCM data transmission system. An additional cyclic interrogation is made of the potential of the transmitting terminals and the result transmitted in an additional time slot added to each time frame; a number of bits $c \geqq 2$ is in the additional time slot. Upon receipt, the $c$ bits are checked to determine that all are received without error; if so, then the additional interrogation information is compared to the normal transmitted polarity reversal information and replaces said normal information with a corrected signal in the event of non-correspondence.

7 Claims, 6 Drawing Figures d=12; c=3

METHOD OF SAFEGUARDING THE TRANSMISSION OF THE CONTINUOUS POLARITY IN DATA TRANSMISSION SYSTEMS TRANSFERRING A POLARITY REVERSAL IN CODED FORM

BACKGROUND OF THE INVENTION

In data transmission systems transferring only the reversals in polarity of the sending data station in any coded form, polarity reversals may be falsely simulated or may not be recognized due to bit errors occurring on the telecommunication circuit, so that a false continuing polarity appears in the central office or the receiving data station. By "continuing polarity" is meant a continuous current of specified polarity occurring on a line during a comparatively long period of time. In switching technology, steady polarities are connection control criteria.

Such a falsification of polarity may lead to an unintended release of a connection or prevent a desired release and should therefore be avoided as much as possible.

Method for safeguarding the correct transmission of the continuing polarity for such transmission systems are known, wherein the polarity of the transmitting lines is additionally cyclically interrogated (sampled) and transmitted.

Such methods need improvement, since the sampling result, in turn, can be falsified during the transmission. If the continuing polarity is transmitted in the same way as the remaining polarity reversals, a new source of errors is thereby introduced into the system.

SUMMARY OF THE INVENTION

It is an object of the invention to safeguard the correct transmission of the sampling signals indicating the continuing polarity to a greater extent than has heretofore been possible.

In accordance with the invention, the foregoing and other objects for safeguarding the correct transmission of the continuing polarity through additional cyclic sampling and transmission of the polarity of the transmitting lines are achieved in that the sampling result is transferred with $c \geqq 2$ bits in an additional time slot, and the polarity information obtained therefrom is utilized further for correction of normally transmitted polarity reversals only if all $c$ bits of the additional sampling result have been received without error.

This is accomplished by comparing at the receiving end the polarity information obtained from the sampling with the polarity information obtained through the normal transmission of the polarity reversals. If there is a discrepancy, then instead of the polarity information obtained through the normal transmission of the polarity reversals, there appears the polarity information obtained through the cyclic sampling. The transferred data may be a sequence of line addresses, in parallel coded, K bit form, of the data signals, i.e., of the transmitting lines, on which polarity reversals occur in an asynchronous time frame. At the sending station, it is determined at what time interval of a pulse frame $T_o$, subdivided into $2^m$ time intervals, one of N polarity reversals has taken place. This information is then stored in the form of a time address and a line address in parallel coded K bit form, as is a one bid code indicating the direction of the polarity reversal. This information is stored in shift registers which are triggered alternately for writing it in and reading it out in the order of its arrival. The information is then transmittted over a transmission line in serial form. At the receiving station, the serial data is converted into asynchronous, parallel data.

Such redundant transmission of the polarity information in the additional time slot has the advantage that in the case of non-correspondence between the related $c$ bits, an error can be determined in the information transmitted in the additional time slot. In this case, the comparison of the sample results with the polarity information obtained through transmission of the polarity reversals is dispensed with. However, if correspondence is determined between all $c$ bits received that pertain to a line, it may be assumed that in all probability the continuous polarity transmitted in the additional time slot represents the actual polarity of the line. In this case, therefore, if the potential obtained through transmission of the polarity reversals has a false value, a correction must be carried out.

The invention can be employed very advantageously in our older application "Method for the transmission of asynchronous information in a synchronous serial time-division multiplex" U.S. application Ser. No. 269,029.

BRIEF DESCRIPTION OF THE DRAWINGS

The principles of the invention will be readily understood by reference to the description of a preferred embodiment given hereinbelow in conjunction with the six figure drawing wherein.

DESCRIPTION OF PREFERRED EMBODIMENT

Figure 1:
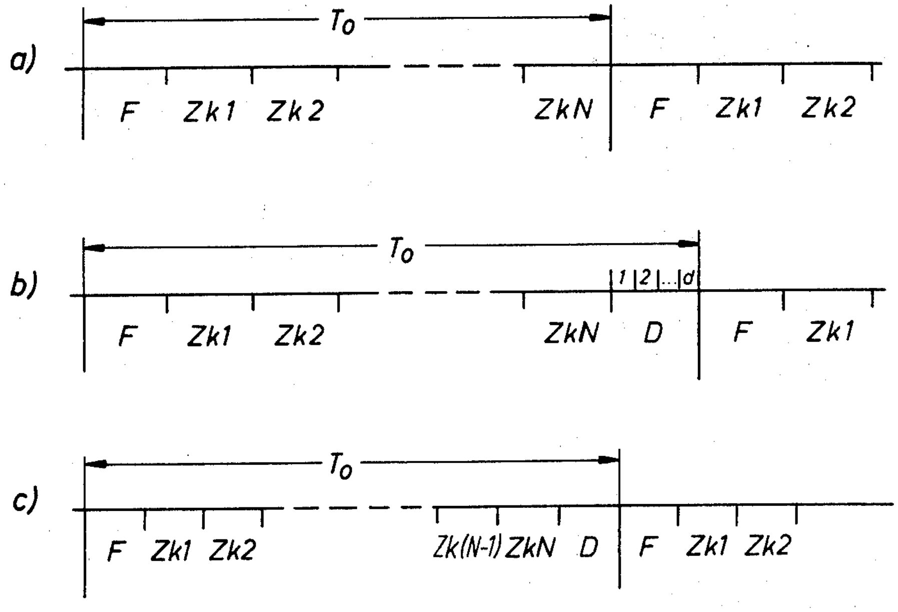
FIGS. 1 *a,b,c* illustrate a transmission data organization in which the additional time slot necessary for carrying out this invention is incorporated.

The transmission principle proposed in the above referenced prior application employs a frame having a well-defined duration $T_o$, at the beginning of which a code word F is transferred by the transmitter which serves in the receiver for frame synchronization and enables recognition of the N time slots (FIG. 1*a*). If required, the time slots Zk1–ZkN are seized in ascending order for the transmission of the line addresses in which a reversal in polarity has occured in the preceding frame. Moreover, the direction of the reversals and the instant of their appearance, referred to the frame start, are transferred in the time slot.

In applying the invented method to such a system, there is created in the frame T, in addition to the code word F required for frame synchronization and the time slots Zk 1 to Zk N transferring the actual information, another time slot in which the potential of the participating terminals, whose number is determined by the existing magnitude of the line address, is transmitted cyclically to an additional storage area at the receiver.

The aditional time slot D provided for the purpose of increasing the reliability of the continuous polarity current can prolong the frame period $T_o$, thereby reducing the number of reversals that can be transferred within a given period (FIG. 1b); or, if the bit rate on the telecommunication circuit is increased, the number of reversals that can be transferred per time unit is maintained, as is the duration of frame period $T_o$. (FIG. 1c).

The allocation of the d bits available in the additional time slot D to the corresponding data lines would be comparatively simple if the number of bits in slot D exceeded the number of distinguishable line addresses and, further, the continuous polarity current were transmitted without safeguard with one bit only. In this case the frame period $T_o$ would be adequate for the transmission of the rest potential of the data lines.

Figure 2:
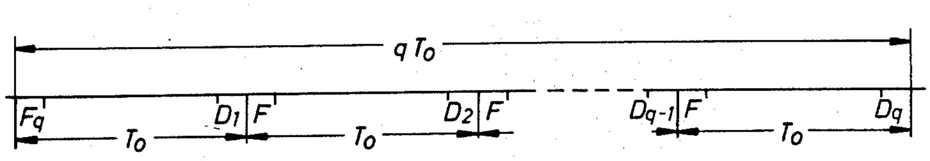
FIG. 2 illustrates a transmission data organization wherein the invention is used in a system having a greater number of terminals than bits available in the added time slot.

However, if in the practical example the number of different line addresses to be transferred exceeds the $d$ bits present in the additional time slot D, then in a frame having the duration $T_o$ only a portion of the rest potentials can be transferred. Hence, the capacity provided for increasing the reliability of the continuous polarity current must extend over several frames having the duration $T_o$. A superframe having the period $q.\ T_o$ must be created or defined, where $q$ is the number of frames present in the superframe. The beginning of a superframe is marked in a known manner by a bit pattern F$q$ which is different from the code word F, the bit pattern F$q$ being transferred instead of F (FIG. 2). If for reasons of security the potential of a data line with $c$ identical bits must be transmitted, then $$q = c.\ 2^k/d$$

where $2^k$ is the number of different line addresses. Attention must be paid to the fact that the additional information to be transferred must travel to the receiver at sufficiently short intervals that a faulty release is prevented by the correction of the continuous polarity.

Figure 3:
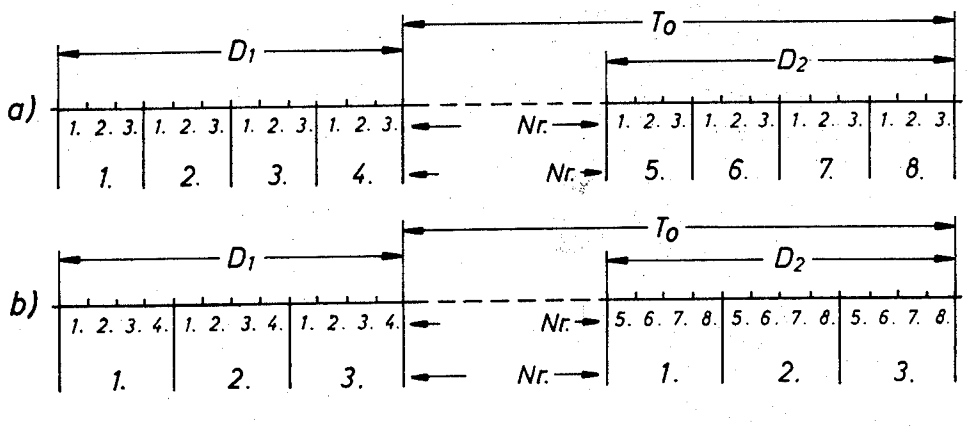
FIGS. 3 *a,b* illustrate a data bit organization within the individual time slots of a time frame.

The $c$ bits transmitting the polarity of a line can be bunched in the additional time slot D (see FIG. 3a) or distributed through the transmission of the time slot in the additional frames (FIG. 3b), but it is not proper to allot the $c$ bits relevant to one line to the added time slots of several different time frames $T_o$, since in this case the evaluation in the receiver is no longer possible.

To transmit the continuing polarity data to the outgoing lines, an additional device is provided in the transmitter portion cooperating with the coder C (P/S) constructed according to the above-referenced application, comprising a scanner such as is well known in the art synchronized by the code word F of the frame or code work Fk of the superframe of the transmission system; at the beginning of a time slot D the scanner interrogates the lines whose continuous polarities are transferred in the same time channel.

Figure 4:
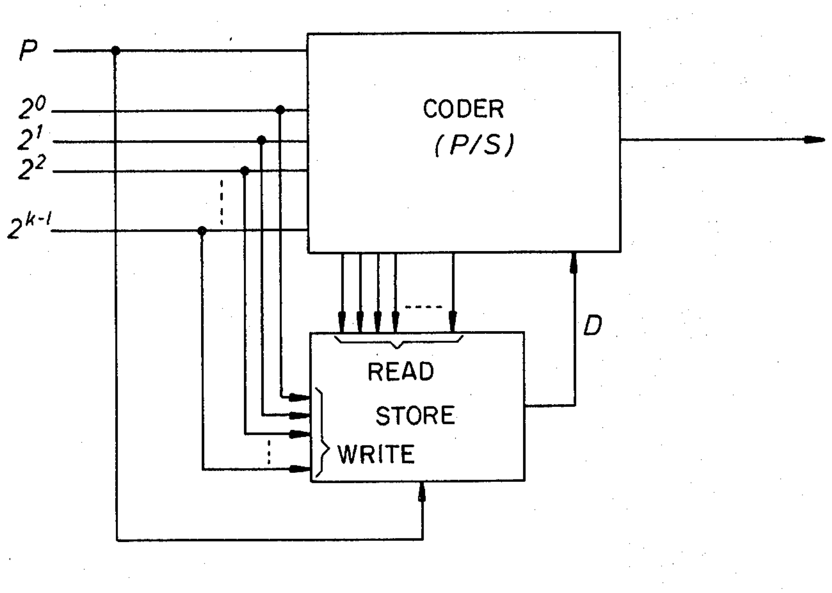
FIG. 4 is a schematic diagram in block form of a sending terminal for transmitting information in the format in accordance with the inventive method.

A random access storage for $2^k$ bits such as is well known in the art is provided as an additional device in the transmitter; then the continuous polarities of all the lines can be displayed in the coder and the interface to the input code converter provided in the above referenced application with ($k$ + 1) lines is retained. The line address offered in parallel on the $k$ lines is utilized for addressing the storage, while the line D which indicates the direction of the polarity reversal is employed for obtaining the continuous polarity current in the storage (FIG. 4). For the cyclic interrogation of the continuous polarity current out of the storage, the addresses are produced by an additional counter in the coding device, and the value of the polarity is inserted in proper phase relation into the time-division multiplex frame and transmitted to the receiver.

Figure 5:
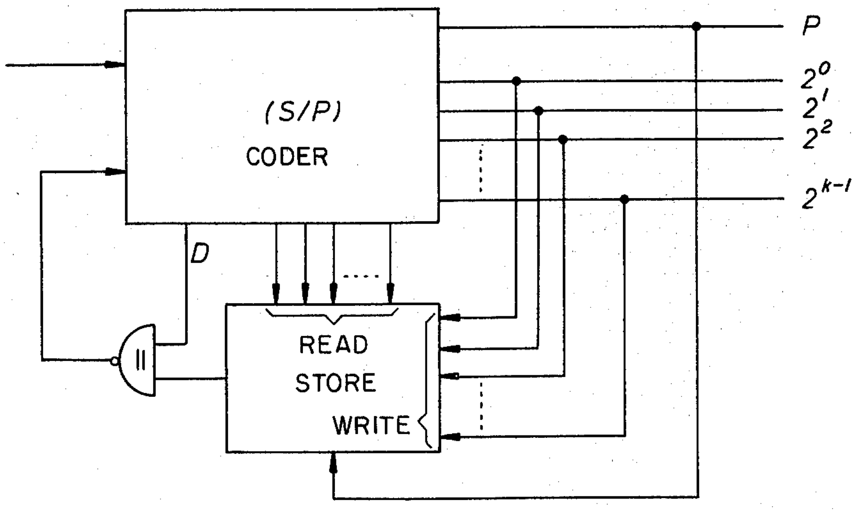
FIG. 5 is a schematic diagram in block form of a receiving terminal for receiving the transmitted information and replacing incorrectly transmitted polarity reversal information with correct polarity information in accordance with the inventive method.
Figure 6:
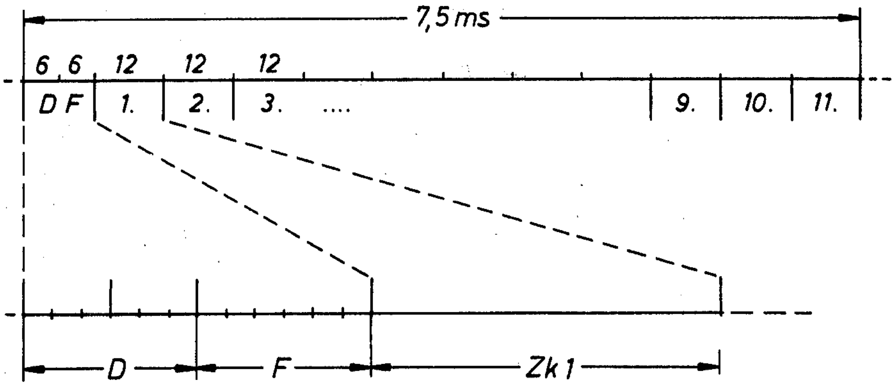
FIG. 6 illustrates a data organization corresponding to an exemplary embodiment of the invention as transmitted and as decoded.

While under certain circumstances additional storage in the transmitter can be dispensed with, in the receiver shown in FIG. 5 a storage device is required which permanently displays the continuous polarity of the lines connected in the receiver if no unnecessary polarity reversals are to be generated in the receiver. The parallel line addresses regained in asynchronous form in the receiver C (S/P) are here reused for writing the continuous polarity into the storage. The readout of the storage is made possible over an address produced synchronously with the reading of time slot D. If the currently received polarity of the line does not correspond to the polarity in the storage, then a correction instruction is sent to the receiver C (S/P) over a gate circuit. Such a correction instruction is converted in the receiver C (S/P) into a parallel line address and provided with the direction of polarity reversals corresponding to the continuous polarity of the line as transmitted in added time slot D by bits $c$. The storage in the receiver is thereby updated and an additional polarity reversal is fed to the central office and, thus, to the receiving subscriber, over the asynchronous interface.

By separating the phase positions in the receiver, the information transmitted in the time slots 1 ... N does not coincide in time with the read statements for the storage containing the information for the continuous polarities.

An information flow of about 19.2 kbit/s is required for transferring the data of 64 subscriber stations if in the coding according to the older proposal a loss probability of less than $10^{-8}$ is required. The period of a synchronous timedivision multiplex frame was determined at 7.5 msec or 144 bits. Eleven time slots of 12 bits each are provided for transmitting the polarity reversals and the related line addresses. For the frame synchronization and for the transmission of the continuous polarity according to the older proposal, six bits are transmitted in each case.

Since in each time slot D the polarity of two data lines can reliably be transmitted with three bits each, $q$ = 32 frames having the period $T_o$ = 7.5 msec, that is, 240 msec, are required for transmitting the continuous polarity of all 64 data lines. Only in extreme cases is this time attained for the correction of a faulty continuous polarity. On an average, a false polarity would be recognized and corrected in half the time.

Only preferred embodiments are described herein; modifications thereof may occur to others which lie within the scope of this invention which is intended to be defined only by the appended claims.

We claim:

1. In a telecommunication switching system normally transferring the polarity reversals occurring in asynchronous form on sending terminals of k parallel transmitting lines via a time division multiplex system, the transmission being carried out in synchronous serial form to a receiving terminal in time frames, each of said time frames comprising a plurality of time slots, a method for safeguarding the correct transmission of a continuous polarity signal occurring on any of said k transmitting lines by additional cyclic interrogation of said transmitting lines and forming an additional information about the polarity on each of said k transmitting lines comprising the steps of:

transmitting said additional information formed concerning each said transmitting lines in the form of $c \geqq 2$ bits in at least one additional time slot (D) in one of said time frames within said time division multiplex system, where $c$ is the number of bits representing the polarity on one of said transmitting lines, receiving said additional information at said receiving terminal, testing the $c$ bits of said received additional information for correct transmission thereof, comparing said received additional information with said polarity reversal transmitted during a normal transmission via the time division multiplex system to determine non-correspondence, and replacing the polarity reversal information provided by said normal transmission with said additional information in response to establishing non-correspondence by said testing.

2. The method as set forth in claim 1, wherein the additional time slot is added to said plurality of time slots in the time frame whereby the time of transmission of each of said time frames is prolonged by the time of said additional time slot (D) (FIG. 1*b*).

3. The method as set forth in claim 1, wherein the additional time slot is added to said plurality of time slots in the frame without increase in the time of transmission of said time frame, and comprising the additional step of increasing the bit rate for the transmission of the bits in each of said time frames, whereby the time of transmission of each of said time frames remains unchanged (FIG. 1*c*).

4. The method as set forth in claim 1, wherein a coding device is provided at the transmitting portion of said transmission system together with an additional storage, and including the steps of storing the results of said additional cyclic interrogation said $k$ transmission lines in said additional storage, and transmitting said results cyclically through said pulse code modulation coding device in said additional time slot.

5. The method as set forth in claim 1, wherein said step of transmitting additional information comprises synchronous time division multiplex transmission of polarity reversals and related code line addresses incoming asynchronously to the sending terminal, said receiving terminal including a coding device having an additional storage device for receiving said additional cyclic interrogation information, and wherein said replacing step includes cyclically interrogating said additional storage device by said coding device, and derivation of a correction polarity reversal instruction in the event of detection of said noncorrespondence.

6. A method as defined in claim 1 including allocating the additional time slots for transmitting results of one of said additional cyclic interrogations of said $k$ lines to a superframe comprising a plurality of successive time frames transmitting the potential of said $k$ lines with $c$ identical bits, the number of frames in said superframe being $$q = c.2^k/d$$

wherein $d$ is the number of bits in said additional time slot in one of said time frames, whereby the $c$ bits comprising said additional interrogation result of said one line may be transmitted in any one of the additional time slots in the superframe carrying the polarity reversal information of said one line.

7. A method as defined in claim 1, wherein all of said $c$ bits relevant to one of said $k$ lines is transmitted in the additional time slot added to the time frame carrying the polarity reversal of said one line.

* * * * *